United States Patent
Jia et al.

(10) Patent No.: US 7,381,682 B1
(45) Date of Patent: Jun. 3, 2008

(54) METHOD FOR PRODUCING HETEROGENEOUS CATALYSTS CONTAINING METAL NANOPARTICLES

(75) Inventors: Jifei Jia, Mountain View, CA (US); Jonathan W. Woo, San Jose, CA (US); Jian Wang, San Mateo, CA (US); Xianghong Hao, Sunnyvale, CA (US)

(73) Assignee: NanoStellar, Inc., Redwood City, CA (US)

( * ) Notice: Subject to any disclaimer, the term of this patent is extended or adjusted under 35 U.S.C. 154(b) by 0 days.

(21) Appl. No.: 11/260,996

(22) Filed: Oct. 28, 2005

Related U.S. Application Data

(63) Continuation of application No. 10/975,646, filed on Oct. 28, 2004, now abandoned.

(51) Int. Cl.
*B01J 23/40* (2006.01)
*B01J 23/42* (2006.01)
*B01J 23/56* (2006.01)
*B01J 23/00* (2006.01)
*B01J 21/04* (2006.01)

(52) U.S. Cl. .................. 502/327; 502/332; 502/334; 502/339; 502/355; 502/415; 502/439

(58) Field of Classification Search ........ 502/326–327, 502/330–334, 339, 344–348, 355, 415, 439, 502/74, 87, 240, 243, 261, 262, 182, 184, 502/185, 349, 350, 304
See application file for complete search history.

(56) References Cited

U.S. PATENT DOCUMENTS

| | | | | |
|---|---|---|---|---|
| 2,760,912 A | * | 8/1956 | Schwarzenbek | 208/138 |
| 2,897,137 A | * | 7/1959 | Schwarzenbek | 208/140 |
| 2,898,289 A | * | 8/1959 | Kimberlin, Jr. et al. | 208/138 |
| 3,169,993 A | * | 2/1965 | Pickens et al. | 564/465 |
| 3,380,934 A | * | 4/1968 | Batzold | 502/339 |
| 3,431,220 A | * | 3/1969 | Batzold | 502/325 |
| 3,536,632 A | | 10/1970 | Kroll | |
| 3,849,343 A | * | 11/1974 | Hoekstra | 502/328 |
| 3,950,243 A | * | 4/1976 | Antos | 208/139 |
| 4,038,175 A | * | 7/1977 | Bhasin | 208/144 |
| 4,073,750 A | * | 2/1978 | Yates et al. | 502/259 |

(Continued)

FOREIGN PATENT DOCUMENTS

GB 1282138 7/1972

OTHER PUBLICATIONS

Hanna Härelind Ingelsten et al., "Deposition of Platinum Nanoparticles, Synthesized in Water-in-oil Microemulsions, on Alumina Supports," *Langmuir*, 2002, vol. 18(5): pp. 1811-1818.

(Continued)

*Primary Examiner*—Cam N. Nguyen
(74) *Attorney, Agent, or Firm*—Patterson & Sheridan, LLP

(57) ABSTRACT

A method for producing highly dispersed catalysts is disclosed. The method includes contacting a support material with a solvent for a period of time, adding a metal salt to the solvent and support mixture, and then adding a reducing agent to the solution to reduce the metal salt to nanometer sized metal particles on the surface of the support. Excess solvent is used in the process, the volume of solvent being greater than two times the pore volume of the support.

18 Claims, 2 Drawing Sheets

U.S. PATENT DOCUMENTS

| | | | |
|---|---|---|---|
| 4,086,275 | A | 4/1978 | Matsuda et al. |
| 4,396,539 | A * | 8/1983 | Sapienza et al. ............ 502/326 |
| 4,835,131 | A | 5/1989 | DeJong |
| 4,839,327 | A | 6/1989 | Haruta et al. |
| 5,213,895 | A | 5/1993 | Hirai et al. |
| 5,275,998 | A | 1/1994 | Tsurumi et al. |
| 5,275,999 | A | 1/1994 | Tsurumi et al. |
| 5,292,931 | A | 3/1994 | Wirtz et al. |
| 5,371,277 | A | 12/1994 | Matsumoto et al. |
| 5,422,329 | A | 6/1995 | Wirtz et al. |
| 5,507,956 | A | 4/1996 | Bonse et al. |
| 5,518,979 | A | 5/1996 | Bonse et al. |
| 6,168,775 | B1 | 1/2001 | Zhou et al. |
| 6,347,284 | B1 | 2/2002 | Ohira et al. |
| 6,569,358 | B1 | 5/2003 | Tai et al. |
| 6,603,038 | B1 | 8/2003 | Hagemeyer et al. |
| 6,627,571 | B1 | 9/2003 | Lugmair et al. |
| 6,686,308 | B2 | 2/2004 | Mao et al. |
| 6,716,525 | B1 | 4/2004 | Yadav et al. |
| 6,746,597 | B2 | 6/2004 | Zhou et al. |
| 6,783,569 | B2 | 8/2004 | Cheon et al. |
| 6,987,200 | B2 | 1/2006 | Hagemeyer et al. |
| 2003/0134744 | A1* | 7/2003 | Blankenship et al. ....... 502/339 |

OTHER PUBLICATIONS

Alexis T. Bell, "The Impact of Nanoscience on Heterogeneous Catalysts," *Science Magazine*, Mar. 2003, vol. 299: pp. 1688-1691.

Jin-An Wang et al., "Inhibition of carbon monoxide on methanol oxidation over γ-alumina supported Ag, Pd and Ag—Pd catalysts," *Applied Surface Science*, 1999, vol. 147: pp. 44-51.

Ioan Balint et al., "Investigation of the morphology—catalytic reactivity relationship for Pt nanoparticles supported on alumina by using the reduction of NO with $CH_4$ as a model reaction," *Chemical Communications*, 2002, 1044-1045.

Akane Miyazaki et al., "Morphology control of platinum nanoparticles and their catalytic properties," *Journal of Nanoparticle Research*, 2003, vol. 5: pp. 69-80.

H. Bönnemann et al., "Nanoscale colloidal metals and alloys stabilized by solvents and surfactants Preparation and use as catalyst precursors," *Journal of Organometallic Chemistry*, 1996, vol. 520: pp. 143-162.

Jung Whan Yoo et al., "Propene hydrogenation over truncated octahedral Pt nanoparticles supported on alumina," *Journal of Catalysis*, 2003, vol. 214: pp. 1-7.

Pierre Braunstein et al., "Strategies for the Anchoring of Metal Complexes, Clusters, and Colloids Inside Nanoporous Alumina Membranes," *Chem. Eur. J.*, 2000, vol. 6(24): pp. 4637-4646.

S.J. Tauster, "Strong Metal—Support Interactions," *Accounts of Chemical Research*, Nov. 1987, vol. 20(11): pp. 389-394.

Lesser Blum et al., "Surface Morphology and Chemically Active Sites on Ru Based Ultracapacitors: Montecarlo Simulation with Embedded Atom Potentials," *MSM 99: Technical Proceedings of the 1999 International Conference on Modeling and Simulation of Microsystems*, 1999, Chapter 3: pp. 75-78.

C.G. Granqvist et al., "Ultrafine metal particles," *Journal of Applied Physics*, May 1976, vol. 47(5): pp. 2200-2219.

* cited by examiner

METHOD FOR PRODUCING HETEROGENEOUS CATALYSTS CONTAINING METAL NANOPARTICLES

RELATED APPLICATION

This application is a continuation of application Ser. No. 10/975,646 filed on Oct. 28, 2004.

BACKGROUND OF THE INVENTION

1. Field of the Invention

The present invention relates to the production of supported catalysts, more specifically to the method for making heterogeneous catalysts containing nano-meter sized metal particles.

2. Description of the Related Art

Many industrial products such as fuels, lubricants, polymers, fibers, drugs, and other chemicals would not be manufacturable without the use of catalysts. Catalysts are also essential for the reduction of pollutants, particularly air pollutants created during the production of energy and by automobiles. The majority of industrial catalysts are composed of a high surface area support material upon which chemically active metal nanoparticles are dispersed. The support materials are generally inert, ceramic type materials having surface areas on the order of hundreds of square meters/gram. This high specific surface area usually requires a complex internal pore system. The metal nano-particles are deposited on the support and dispersed throughout this internal pore system, and are generally between 1 and 100 nanometers in size. Catalysts of this type are also referred to as heterogeneous catalysts, because the catalyst particles are solid phase, while the reactants interacting with the catalyst are generally liquid or gas phase.

Processes for making supported catalysts go back many years. One such process for making platinum catalysts, for example, involves the contacting of a support material such as alumina with a metal salt solution such as a platinum chloride solution. The salt solution "impregnates" or fills the pores of the support during this process. Following the impregnation, the support containing the salt solution would be air dried, causing the metal salt to precipitate within the pores. The support containing the crystallized metal salt would then be exposed to a hydrogen or carbon monoxide gas environment, reducing the solid metal salt to metal particles. This process, however, made it difficult to produce highly dispersed catalysts because of the difficulty in controlling the precipitated metal salt crystallite sizes and distributions. Often, depending on the reduction conditions, the metal particles would diffuse together creating larger, less desirable particles (sintering).

With the advent of the more recent focus of nanotechnology, methods for fabricating nanometer sized metal particles in liquid solutions have been combined with impregnation techniques to create heterogeneous catalysts. This process offers the potential advantage of being able to determine metal particle size, morphology and particle size distribution prior to impregnation into the support.

Yoo et al., in an article entitled "Propene Hydrogenation Over Truncated Octahedral Pt Nanoparticles Supported on Alumina", Journal of Catalysis, 214 (2003), pg 1-7, discloses a process for loading colloidal Pt nanoparticles (synthesized by a 1:5 concentration ratio of $K_2PtCl_4$ to polyacrylate capping polymer) into an alumina support via impregnation.

Miyazaki et al., in an article entitled "Morphology Control of Platinum Nanoparticles and Their Catalytic Properties", Journal of Nanoparticle Research, Vol. 5, pg 69-80, 2003, discloses the preparation of Pt nanoparticles of varying morphology through the use of different capping polymers. Various shapes (such as square, triangular, and hexagonal) of platinum crystallites, as observed by transmission electron microscopy, were obtained. Supported catalysts were made by impregnation of previously formed Pt crystallites into an alumina support. Water was removed from the support by freeze drying, and the capping polymers were removed by calcining in air at 500° C. for 8 hours.

U.S. Pat. No. 6,569,358 discloses a method of preparing a porous material incorporating ultrafine metal particles comprising the following steps: (1) preparing surface-protected ultrafine metal particles by reducing metal ions in the presence of molecules such as dodecanethiol molecules; (2) immersing a wet gel in a solution of the ultrafine metal particles, thus forming an ultrafine metal particle/wet gel composite in which the ultrafine metal particles are incorporated in the wet gel; and (3) drying the ultrafine metal particle/wet gel composite to form a porous body.

The aforementioned processes utilize a protecting agent, or capping polymer, to control particle size, morphology, and reduce agglomeration. However, removal of the capping polymers or protecting agents can be an issue for sensitive catalytic processes, as their destruction may leave contaminating residues that are undesirable. These residues may reduce activity of the catalyst by occupying active sites necessary for subsequent reactions. The residues may also leave behind trace quantities of poisons that will eventually kill the catalyst over time. Removal of organic capping agents and polymers usually require oxidation (or burning), the exothermic heat from which can produce unwanted sintering due to the high temperatures. Sintering will increase the metal particle size and reduce the active surface area which is undesirable. Furthermore, the use of capping agents can hinder the introduction of the metal crystallites into small pores of the support.

U.S. Pat. No. 6,686,308 discloses a supported catalyst comprising catalyst metal nanoparticles having an average particle size of typically 2.0 nm or less, which are supported on support particles at a loading of 30% or more. Typical catalyst metals are selected from platinum, palladium, ruthenium, rhodium, iridium, osmium, molybdenum, tungsten, iron, nickel and tin. Typical support particles are carbon. A method of making a supported catalyst comprises the steps of: a) providing a solution of metal chlorides of one or more catalyst metals in solvent system containing at least one polyalcohol, typically ethylene glycol containing less than 2% water; b) forming a colloidal suspension of unprotected catalyst metal nanoparticles by raising the pH of the solution, typically to a pH of 10 or higher, and heating said solution, typically to 125° C. or higher; c) adding support particles to the colloidal suspension; and d) depositing the unprotected catalyst metal nanoparticles on the support particles by lowering the pH of said suspension, typically to a pH of 6.5 or lower.

U.S. Pat. No. 6,603,038 discloses a method for producing a catalyst containing one or several metals from the group of metals comprising the sub-groups Ib and VIIIb of the periodic table on porous support particles, characterized by a first step in which one or several precursors from the group of compounds of metals from sub-groups Ib and VIIIb of the periodic table is or are applied to a porous support, and a second step in which the porous, preferably nanoporous support to which at least one precursor has been applied is treated with at least one reduction agent, to obtain the metal nanoparticles produced in situ in the pores of the support. Catalysts were typically prepared by impregnation of the support with a metal salt solution, followed by a drying step. Subsequent to drying, the impregnated support materials were reduced by various techniques including re-impregnation with liquid reducing agents. Typically, the initial salt impregnation process was performed with support to salt solution ratios on the order of 1 g support/1 ml solution. These impregnation conditions are typical of traditional prior art, and generally result in lower dispersions and poor control of particle sizes and particle size distributions.

What is needed is a catalyst manufacturing process that provides improved control over metal crystallite particle sizes, distributions and morphologies without the contamination of capping agents.

SUMMARY OF THE INVENTION

It is an object of the present invention to provide a method for producing a catalyst including the steps of (1) contacting a quantity of support with a volume of solvent for a time period, creating a liquid mixture, (2) adding a metal salt to the liquid mixture following the time period, and (3) contacting a reducing agent with the liquid mixture, wherein the metal salt is reduced to metal particles on the surface of the support.

It is an other object of the present invention to provide a method for producing a catalyst including (1) contacting a quantity of support with a volume of solvent, creating a liquid mixture wherein the volume of solvent is greater than two times the pore volume of the quantity of support, (2) adding a metal salt to the liquid mixture and, (3) contacting a reducing agent with the liquid mixture, wherein the metal salt is reduced to metal particles on the surface of the support.

It is yet another object of the present invention to provide a method for producing a catalyst including (1) contacting a quantity of support with a volume of solvent for a time period, creating a liquid mixture wherein the volume of solvent is greater than two times the pore volume of the quantity of support, (2) adding a metal salt to the liquid mixture following the time period and, (3) contacting a reducing agent with the liquid mixture, wherein the metal salt is reduced to metal particles on the surface of the support.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1:
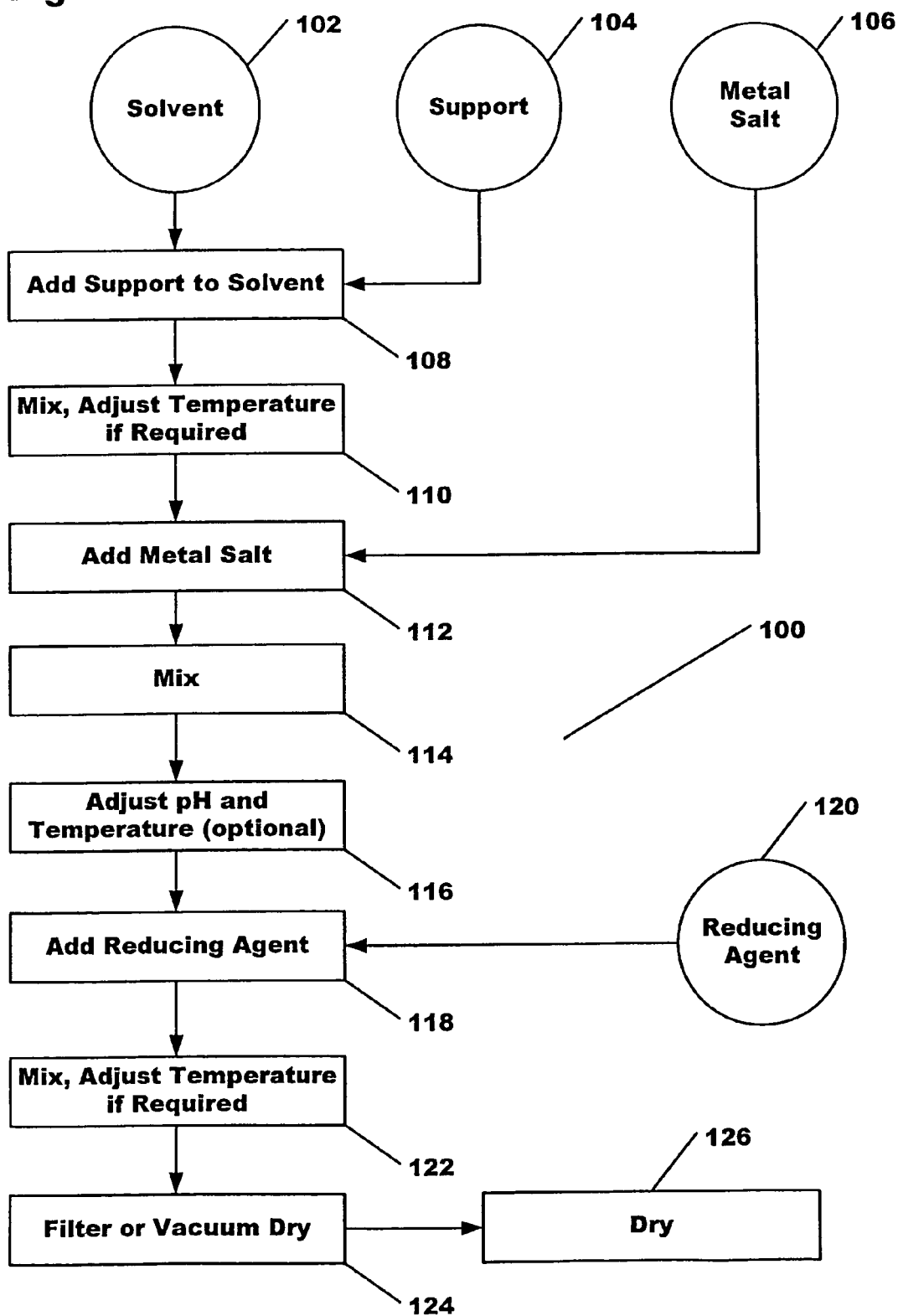
FIG. 1 is a process flow block diagram of a method for making catalysts according to an embodiment of the present invention.

FIG. 1 is a process flow block diagram 100 of a method for making catalysts according to an embodiment of the present invention. Reagents and starting materials for the process are represented schematically by circles 102-106 and 120. In step 108, solvent 102 and support 104 are combined. Solvent 102 may be any liquid within which metal salt 106 is suitably soluble, is sufficiently pure enough, and can be removed from the support by drying or vacuum evaporation. Such solvents include, but are not limited to water, alcohol, and other organic solvents. Preferably, water is used. More preferably, double de-ionized water is used. Alcohols that are suitable include, but are not limited to methanol and ethanol and their mixtures, with and without water. Other organic solvents include tetrahydrofuran, acetic acid, ethylene glycol, N-methylpyrrolidone, dimethylformamide, dimethylacetalmide, and their mixtures, with and without water. Support 104 materials may include, but are not limited to, alumina, silica, oxides of vanadium, oxides of titanium, oxides of zirconium, oxides of iron, cerium oxides, carbon, zeolites, and molecular sieves. Solvent to support ratios (pore volume basis) are greater than 2 (solvent volume/support pore volume), preferably 10 to 100. As an example, alumina typically has a support pore volume density of 1 $cm^3/g$, so the solvent to support ratio for water and alumina, on a weight basis, would be approximately equal to the solvent to support ratio computed on a pore volume basis. For other support/solvent combinations, this may not be the case. However, irrespective of the solvent or support combination, it is important that sufficient solvent be provided to fully wet the entire pore volume of the support, and that additional solvent is provided to ensure "fluid like" behavior of the mixture. In step 110, solvent 102 and support 104 are mixed for a time period between 1 minute and 24 hours, preferably between 1 and 4 hours. Sufficient agitation to keep the support solids in suspension is desirable. If necessary, the temperature may be adjusted in this step. Typically, ambient temperature is used, within the range of 15 to 30° C.

Steps 108 and 110 distinguish the present invention from the prior art in that the support is pre-wetted with the solvent prior to the addition of the metal salt. These steps ensure uniform (and complete) wetting of the support with the solvent, which enables a more uniform distribution of the metal salt within the pores of the support, and more uniform reduction to metal crystallites in subsequent steps. This process is aided by the use of higher solvent to support ratios, which facilitate transport of metal salts and reducing components into the support pore structures via diffusion. In a typical impregnation process of the prior art, low solvent to support ratios (typically 1.0) are used to ensure that a high percentage of the metal salt is introduced into the pores of the support, leaving a minimum of solution left outside of the support, prior to drying. These conditions often result in high metal salt concentrations within the pores of the support, and potential incomplete wetting of the entire pore structure. High salt concentrations can lead to non-uniform precipitated metal salt distributions as the catalyst undergoes drying and the solutions within the pores become supersaturated.

In step 112, metal salt 106 is added to the solvent/support mixture. Soluble salts of metals including Pt, Pd, Ru, Rh, Re, Ir, Os, Fe, Co, Ni, Cu, Ag, Au, Zn, Cd, In, Ga, Sn, Pb, Bi, Sb, Ti, Zr, Cr, Mo, W, V, Nb and Mn are suitable. Of the foregoing, soluble salts of Pt, Pd, Ru. Rh, Re, Cu, Au, Re, Ir, Os and Ag are preferable. For example, Pt salts that are suitable include $Pt(NO_3)_2$, $(NH_3)_4Pt(NO_3)_2$, $H_2PtCl_6$, $K_2PtCl_4$, $(NH_3)_4Pt(OH)_2$, and $Cl_4Pt(NH_3)_2$. An example of Cu and Ag salts that are suitable include $AgNO_3$, $AgCH_3COO$, $Cu(NO_3)_2$, $Cu(CH_3COO)_2$, and Cu(II)acetylacetonate. An example of suitable Pd salts include $Pd(NH_3)_4(NO_3)_2$ and $Pd(NO_3)_2$. Following addition of the salt to the solvent/support mixture, concentration of the salt is between $10^{-6}$ M and 1M, preferably between $10^{-4}$ M and 0.1M. The concentration of the salt will depend on the target weight loading of the final catalyst and the solvent to support ratio used in step 108.

In step 114, the mixture including the solvent, metal salt, and support are mixed. The mixing time is between 1 and 4 hours, preferably between 1 and 2 hours. Sufficient agitation to keep the support solids in suspension is desirable. Agitation is also required to fully dissolve the salt compounds within the solvent and reduce any salt concentration gradients within the liquid solution. The temperature is the same as previous steps 108 and 110. In step 116, the pH and temperature of the solvent, metal salt, and support are adjusted, if required. If the temperature or pH are adjusted, an additional mixing period is provided. The additional mixing period is between 1 and 4 hours, preferably between 1 and 2 hours. In some embodiments of the present invention, only the temperature is adjusted. In other embodiments of the present invention, only the pH is adjusted. In yet other embodiments of the present invention, both pH and temperature are adjusted. In all embodiments, temperature is within a range of approximately 0° C. and 100° C. When pH is adjusted, it is generally within the range of approximately 3 to 11. Nitric acid and ammonium hydroxide are used to adjust the pH, when required.

In step 118, reducing agent 120 is added to the solvent, support, and metal salt mixture of step 116. Suitable reducing agents include, but are not limited to $H_2$, CO, $N_2H_4$, $NH_2OH$, alcohols, citrates such as sodium, potassium, and ammonium citrate; alkali metal borohydrides such as sodium and potassium borohydride; and glycols. Preferably, $H_2$, $NH_2OH$ and $N_2H_4$ are used. For the case of reduction by $H_2$, an Argon purging step may precede the introduction of hydrogen to de-gas the solution and remove any dissolved oxygen. The quantity of reducing agent added is determined by the amount of metal salt. An amount between 1 and 200 times the stoichiometric requirement needed to reduce the metal salt can be used, preferably between 1 and 10 times the stoichiometric requirement. In step 122, the reducing agent, solvent, support, and metal salt are mixed while the metal salt is reduced to nanometer sized metal particles or crystallites on the support surfaces within the pores of the support. Sufficient agitation to keep the support solids in suspension is desirable. Agitation is also required to reduce concentration gradients within the liquid solution. Step 122 is carried out for a time period long enough to complete the reduction of the metal salt. For hydrogen reduction, this time period can be between 0.1 to 48 hours, preferably 18-30 hours. For the other reducing agents, the time period can be between 1 minute to 24 hours, preferably between 5 minutes to 8 hours. As the nanometer metal particles are nucleated and grow within the pores, the metal salt concentration in the pores drops, producing a concentration gradient which draws more metal salt into the pores from the bulk solution surrounding the support. The higher solvent to support ratios used in the present invention facilitate this liquid phase diffusion transport, reducing concentration gradients in the bulk fluid by allowing thorough convective mixing of this fluid, unhindered by the solid support particles. At the termination of the process, essentially all of the metal salt is deposited as metal particles within the pores of the support. An additional advantage of the higher solvent to support ratios used in the present invention is a reduction of the potential to nucleate and grown metal crystallites homogeneously in the bulk of the solvent, due to the low concentration of metal salt. This reduces any potential loss of expensive catalyst materials such as Pt or Pd. Attempting to carry out the liquid phase, in-situ reduction process at low solvent to support ratios (near 1.0) could significantly increase the potential homogeneous nucleation and growth of crystallites outside the support. The lower free solution volume combined with high solids content would significantly hinder diffusion transport into the support pore structure, tending to support and enhance any homogeneous nucleation process.

In step 124, the newly formed catalyst is separated from the remaining solvent by any convenient method, such as conventional filtration, vacuum drying, or freeze drying. In step 126, the catalyst is dried at an elevated temperature between 100 and 150° C., preferably about 120° C.

The following examples serve to explain and illustrate embodiments of the present invention, without all embodiments being restricted to the examples presented.

In the following examples, particle sizes and distributions were determined by transmission electron microscopy (TEM), as is well known to those skilled in the art. Prior to TEM measurement, the metal particles were separated from the support by dissolving the alumina support in 10-50% HF, by methods well known in the art. Dimension measurements made by TEM are subject to an estimated error of 10%.

In the following examples, a representative catalytic activity was determined by measurement of CO oxidation "light off" temperatures. Prior to the measurement of CO oxidation activity, the catalysts were subjected to a standardized calcining process following air drying. The standardized process consisted of (1) loading the catalyst into a reactor, (2) purging with He to remove air at room temperature, (3) heating the catalyst in 1% oxygen (remainder inert gas) at a rate of 3° C./minute from room temperature to about 500° C., (4) purging for 10 minutes with pure He to remove oxygen (at 500° C.), (5) purging in 5% hydrogen (remainder inert gas) for 1 hour at 500° C., (6) cooling and purging in pure He to cool to room temperature. Without removing the catalyst from the reactor, the CO oxidation was then carried out. The CO oxidation process consisted of (1) purging the reactor with the reaction mixture of 1.4% CO, 5.6% $O_2$ (balance He) at room temperature, (2) heating the reactor from room temperature to 200° C. at about 2° C./minute with the afore mentioned $CO/O_2$ mixture. During this heating step, $CO_2$ yield was measured as a function of temperature. The temperature at 50% $CO_2$ yield is noted in the examples below.

Example 1

Steps 108, 110: 2 g SBA-150 alumina (BET surface area was 150 $m^2/g$) was added to 58 ml DDI (double de-ionized) $H_2O$ and stirred for 2 hours at room temperature.

Steps 112, 114: 0.8 ml $Pt(NO_3)_2$ solution (8 mg Pt) was added to the system and stirred for 1.5 hours at room temperature.

Steps 118, 122: $2.05 \times 10^{-4}$ moles $N_2H_4$ (0.50 ml 0.41 M $N_2H_4$) was added to the solution and stirred for 2 hours at room temperature.

Steps 124, 126: Mixture was filtered, then dried at 120° C. for 2 hours.

The catalyst produced with the example process above had an average Pt particle diameter of 3.17 nanometers+/−a standard deviation of 1.4 nanometers. The range of particle sizes was 1.6 to 14.3 nanometers. The CO oxidation light off temperature (at 50% $CO_2$ yield) was 134° C. Metal weight loading was 0.4%.

Example 2

Steps 108, 110: 2 g SBA-150 alumina (BET surface area was 150 $m^2/g$) was added to 60 ml DDI (double de-ionized) $H_2O$ and stirred for 2 hours at room temperature.

Steps 112, 114: 0.8 ml $Pt(NO_3)_2$ solution (8 mg Pt) was added to the system and stirred for 1.5 hours at room temperature.

Steps 118, 122: The solution purged with pure Ar for 20 min, then purged with pure $H_2$ for 10 min while stirring. Then the system was sealed while stirring for 24 hours.

Steps 124, 126: Mixture was filtered, then dried at 120° C. for 2 hours.

The catalyst produced with the example process above had an average Pt particle diameter of 3.55 nanometers+/−a standard deviation of 1.2 nanometers. The range of particle sizes was 1.3 to 9.1 nanometers. The CO oxidation light off temperature (at 50% $CO_2$ yield) was 131° C. Metal weight loading was 0.4%.

Example 3

Steps 108, 110: 2 g SBA-150 alumina (BET surface area was 150 $m^2/g$) was added to 60 ml DDI (double de-ionized) $H_2O$ and stirred for 2 hours at room temperature.

Steps 112, 114: 0.8 ml $Pt(NO_3)_2$ solution (8 mg Pt) was added to the system and stirred for 1.5 hours at room temperature.

Steps 118, 122: $8.2 \times 10^{-4}$ moles $NH_2OH$ (2.0 ml 0.41 M $NH_2OH$) was added to the solution and stirred for 2 hours at room temperature.

Steps 124, 126: Mixture was filtered, then dried at 120° C. for 2 hours.

The catalyst produced with the example process above had an average Pt particle diameter of 4.35 nanometers+/−a standard deviation of 1.3 nanometers. The range of particle sizes was 1.7 to 11.7 nanometers. The CO oxidation light off temperature (at 50% $CO_2$ yield) was 139° C. Metal weight loading was 0.4%.

Example 4

Steps 108, 110: 2 g SBA-150 alumina (BET surface area was 150 $m^2/g$) was added to 58 ml DDI (double de-ionized) $H_2O$ and stirred for 2 hours at room temperature.

Steps 112, 114: 0.82 ml 0.05 M $AgNO_3$ solution ($4.1 \times 10^{-5}$ moles Ag) was added to the system and stirred for 2 hours at room temperature.

Step 116: 0.1 M $HNO_3$ was added to adjust pH of the solution to 3.86 while stirring at about 100° C. for 1.5 hours.

Steps 118, 122: $8.157 \times 10^{-4}$ moles $N_2H_4$ (0.0739 ml 35% $N_2H_4$) was added to the solution and stirred for 2 minutes at 100° C. Solution was then cooled to 0° C. and stirred for 2 hours. Solution then heated to room temperature.

Steps 124, 126: Mixture was vacuum dried until solid at room temperature, then dried at 120° C. for 2 hours.

The catalyst produced with the example process above had a CO oxidation light off temperature (at 50% $CO_2$ yield) of 111° C. Metal weight loading was 0.22%.

Example 5

Steps 108, 110: 2 g SBA-150 alumina (BET surface area was 150 $m^2/g$) was added to 59 ml DDI (double de-ionized) $H_2O$ and stirred for 2 hours at room temperature.

Steps 112, 114: 0.82 ml 0.05 M $AgNO_3$ solution ($4.1 \times 10^{-5}$ moles Ag) was added to the system and stirred for 1.5 hours at room temperature.

Steps 118, 122: The solution purged with pure Ar for 20 min, then purged with pure $H_2$ for 10 min while stirring. Then the system was sealed while stirring for 18 hours.

Steps 124, 126: Mixture was vacuum dried until solid at room temperature, then dried at 120° C. for 2 hours.

The catalyst produced with the example process above had a CO oxidation light off temperature (at 50% $CO_2$ yield) of 140° C. Metal weight loading was 0.22%.

Example 6

Steps 108, 110: 2 g SBA-150 alumina (BET surface area was 150 $m^2/g$) was added to 60 ml DDI (double de-ionized) $H_2O$ and stirred for 2 hours at room temperature.

Steps 112, 114: 1.54 ml 0.5 M $AgNO_3$ solution ($7.69 \times 10^{-4}$ moles Ag) was added to the system and stirred for 1.5 hours at room temperature.

Steps 118, 122: $2.31 \times 10^{-3}$ moles $NH_2OH$ (1.413 ml 5% $NH_2OH$) was added to the solution and stirred for 0.9 hours at room temperature.

Steps 124, 126: Mixture was filtered, then dried at 12° C. for 2 hours.

The catalyst produced with the example process above had a CO oxidation light off temperature (at 50% $CO_2$ yield) of 79° C. Metal weight loading was 4.15%.

Example 7

Steps 108, 110: 2 g SBA-150 alumina (BET surface area was 150 $m^2/g$) was added to 60 ml DDI (double de-ionized) $H_2O$ and stirred for 2 hours at room temperature.

Steps 112, 114: 0.3075 ml 0.5 M $AgNO_3$ solution ($1.54 \times 10^{-4}$ moles Ag) was added to the system and stirred for 2.2 hours at room temperature.

Steps 118, 122: $4.63 \times 10^{-4}$ moles $NH_2OH$ (1.13 ml of 0.41 M $NH_2OH$) was added to the solution and stirred for 1.0 hours at room temperature.

Steps 124, 126: Mixture was filtered, then dried at 120° C. for 2 hours.

The catalyst produced with the example process above had a CO oxidation light off temperature (at 50% $CO_2$ yield) of 116° C. Metal weight loading was 0.83%.

Example 8

Steps 108, 110: 2 g SBA-150 alumina (BET surface area was 150 $m^2/g$) was added to 60 ml DDI (double de-ionized) $H_2O$ and stirred for 2 hours at room temperature.

Steps 112, 114: 0.82 ml 0.05 M $Cu(NO_3)_2$ solution ($4.1 \times 10^{-5}$ moles Cu) was added to the system and stirred for 1.5 hours at room temperature.

Steps 118, 122: $4.1 \times 10^{-4}$ moles $NH_2OH$ (0.0252 ml of 50% $NH_2OH$) was added to the solution and stirred for 1.0 hours at room temperature.

Steps 124, 126: Mixture was filtered, then dried at 120° C. for 2 hours.

The catalyst produced with the example process above had a CO oxidation light off temperature (at 50% $CO_2$ yield) of 195° C. Metal weight loading was 0.13%.

Example 9

Steps 108, 110: 2 g SBA-150 alumina (BET surface area was 150 $m^2/g$) was added to 60 ml DDI (double de-ionized) $H_2O$ and stirred for 1.5 hours at room temperature.

Steps 112, 114: 0.8 ml 0.05125 M $Pd(NH_3)_4(NO_3)_2$ solution (4.364 mg Pd) was added to the system and stirred for 2.0 hours at room temperature.

Steps 118, 122: $8.2 \times 10^{-4}$ moles $NH_2OH$ (2.0 ml of 0.41 M $NH_2OH$) was added to the solution, and stirred for 2.0 hours at room temperature.

Steps 124, 126: Mixture was filtered at room temperature, then dried at 120° C. for 2 hours.

The catalyst produced with the example process above had a CO oxidation light off temperature (at 50% $CO_2$ yield) of 125° C. Metal weight loading was 0.218%.

Example 10

Steps 108, 110: 2 g SBA-150 alumina (BET surface area was 150 m²/g) was added to 60 ml DDI (double de-ionized) $H_2O$ and stirred for 2 hours at room temperature.

Steps 112, 114: 1.54 ml 0.5 M $Cu(NO_3)_2$ solution (7.69×$10^{-4}$ moles Cu) was added to the system and stirred for 1.6 hours at room temperature.

Steps 118, 122: $1.54 \times 10^{-3}$ moles $NH_2OH$ (3.75 ml of 0.41 M $NH_2OH$) was added to the solution and stirred for 5 minutes at room temperature.

Steps 124, 126: Mixture was filtered, then dried at 120° C. for 2 hours.

The catalyst produced with the example process above had a CO oxidation light off temperature (at 50% $CO_2$ yield) of 105° C. Metal weight loading was 2.44%.

Example 11

Steps 108, 110: 2 g SBA-150 alumina (BET surface area was 150 m²/g) was added to 60 ml DDI (double de-ionized) $H_2O$ and stirred for 2 hours at room temperature.

Steps 112, 114: 4.1 ml 0.5 M $Cu(NO_3)_2$ solution (2.05×$10^{-3}$ moles Cu) was added to the system and stirred for 2.8 hours at room temperature.

Steps 118, 122: $1.23 \times 10^{-2}$ moles $NH_2OH$ (0.754 ml of 50% $NH_2OH$) was added to the solution and stirred for 8 hours at room temperature.

Steps 124, 126: Mixture was filtered, then dried at 120° C. for 2 hours.

The catalyst produced with the example process above had a CO oxidation light off temperature (at 50% $CO_2$ yield) of 69° C. Metal weight loading was 6.51%.

Figure 2:
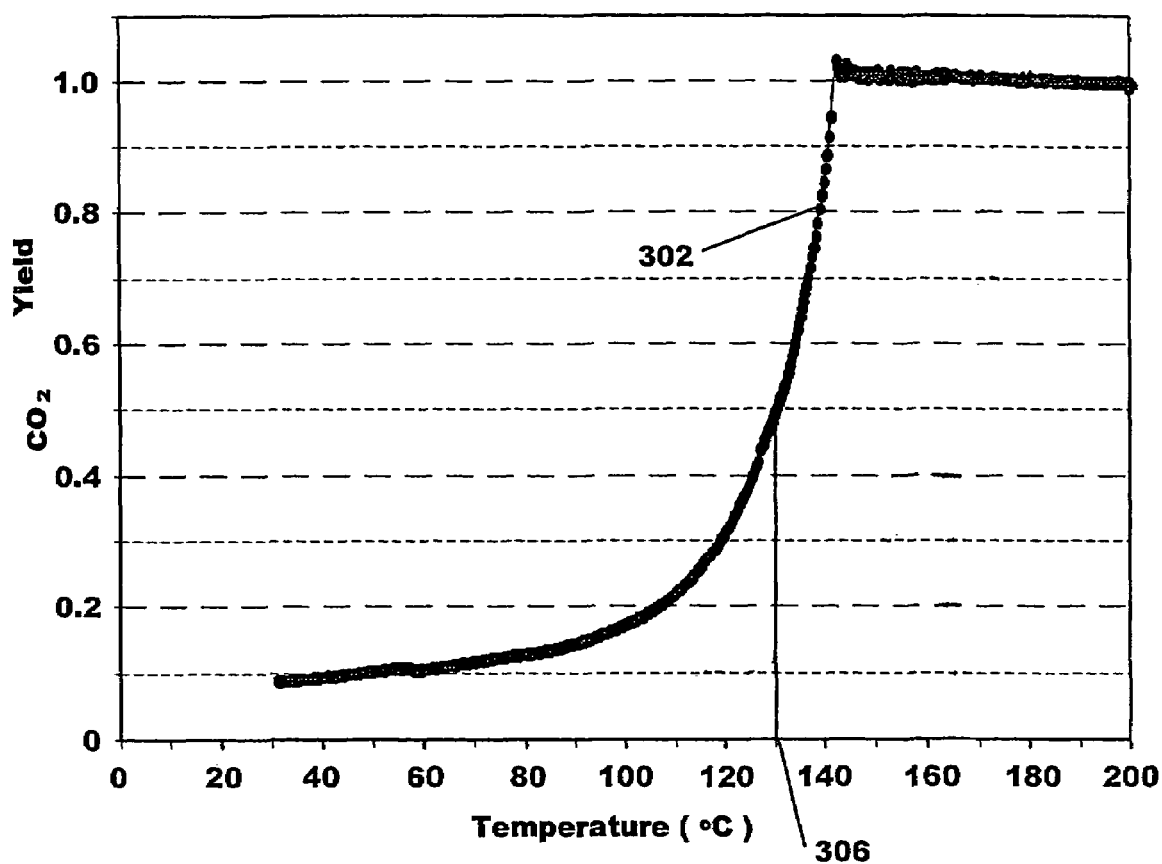
FIG. 2 is a chart of $CO_2$ yield versus reaction temperature for two catalysts made according to embodiments of the present invention.

FIG. 2 is a chart of $CO_2$ yield versus reaction temperature for two catalysts made according to embodiments of the present invention. Curve 302 is the "light off" curve for CO oxidation to $CO_2$ for the Pt catalyst made in Example 2 above. The CO oxidation light off temperature at 50% $CO_2$ yield is shown by ref 306 as about 131° C.

The present invention is not limited by the previous embodiments heretofore described. Rather, the scope of the present invention is to be defined by these descriptions taken together with the attached claims and their equivalents.

What is claimed is:

1. A method for producing a supported platinum catalyst comprising:
   contacting a quantity of alumina support material with a volume of water for a first time period to form a liquid mixture, wherein said volume of water is greater than two times a pore volume of said quantity of alumina support material;
   adding a platinum salt solution having a molar concentration of 0.0001 to 0.1 to said liquid mixture following said first time period and stirring said liquid mixture for a second time period; and
   adding a reducing agent to said liquid mixture following said second time period and stirring said liquid mixture for a third time period, wherein said platinum salt is reduced to platinum particles within pores of said quantity of alumina support material within said liquid mixture during said third time period,
   wherein the average platinum particle diameter is greater than 3.0 nm and less than 5.0 nm.

2. The method as recited in claim 1, wherein said platinum salt solution added to said liquid mixture comprises dissolved platinum ions.

3. The method as recited in claim 2, wherein pH of said liquid mixture is not adjusted after the platinum salt solution is added to said liquid mixture.

4. The method as recited in claim 3, wherein said reducing agent is chosen from the group consisting of $N_2H_4$, $NH_2OH$, sodium citrate, potassium citrate, ammonium citrate, alkali metal borohydrides, alcohols and glycols.

5. The method as recited in claim 4, wherein said reducing agent comprises $N_2H_4$.

6. The method as recited in claim 1, wherein the step of adding the reducing agent comprises purging said liquid mixture with argon and then purging said liquid mixture with hydrogen.

7. The method as recited in claim 1, wherein the platinum weight loading of the supported platinum catalyst is less than 1%.

8. The method as recited in claim 1, wherein the range of platinum particle diameters is about 1 nm to 15 nm.

9. The method as recited in claim 1, wherein the platinum salt solution comprises a $Pt(NO_3)_2$ salt solution.

10. A method for producing a supported platinum catalyst comprising:
    contacting a quantity of alumina support material with a volume of water for a first time period to form a liquid mixture, wherein said volume of water is greater than two times a pore volume of said quantity of alumina support material;
    obtaining a platinum salt solution having a molar concentration of 0.0001 to 0.1;
    adding the platinum salt solution to said liquid mixture following said first time period and stirring said liquid mixture for a second time period;
    adding a reducing agent to said liquid mixture following said second time period and stirring said liquid mixture for a third time period;
    filtering the liquid mixture to separate out said quantity of alumina support material with platinum particles supported thereon; and
    drying said quantity of alumina support material with platinum particles supported thereon,
    wherein said platinum salt is reduced to platinum particles within pores of said quantity of alumina support material within said liquid mixture during said third time period prior to said filtering and said drying, and
    wherein the average platinum particle diameter is greater than 3.0 nm and less than 5.0 nm.

11. The method as recited in claim 10, wherein pH of said liquid mixture is not adjusted after the platinum salt solution is added to said liquid mixture.

12. The method as recited in claim 11, wherein said reducing agent is chosen from the group consisting of $N_2H_4$, $NH_2OH$, sodium citrate, potassium citrate, ammonium citrate, alkali metal borohydrides, alcohols and glycols.

13. The method as recited in claim 12, wherein said reducing agent comprises $N_2H_4$.

14. The method as recited in claim 12, wherein the step of adding the reducing agent comprises purging said liquid mixture with argon and then purging said liquid mixture with hydrogen.

15. The method as recited in claim 10, wherein the platinum weight loading of the supported platinum catalyst is less than 1%.

16. The method as recited in claim 10, wherein the range of platinum particle diameters is about 1 nm to 15 nm.

17. The method as recited in claim 10, wherein the platinum salt solution comprises a $Pt(NO_3)_2$ salt solution.

18. The method as recited in claim 10, wherein the third time period is about 1 to 2 hours.

* * * * *